US005315728A

United States Patent [19]
Atkins

[11] Patent Number: 5,315,728
[45] Date of Patent: May 31, 1994

[54] SWIMMING POOL CLEANER COMPONENTS

[75] Inventor: David S. Atkins, Broederstroom, South Africa

[73] Assignee: Zarina Holding C.V., Amsterdam, Netherlands

[21] Appl. No.: 115,394

[22] Filed: Aug. 31, 1993

Related U.S. Application Data

[63] Continuation of Ser. No. 879,772, May 6, 1992, abandoned.

[51] Int. Cl.5 .............................................. E04H 4/16
[52] U.S. Cl. ....................................... 15/1.7; 137/798; 137/843
[58] Field of Search ................... 15/1.7, 404; 137/843, 137/844, 798, 907; 251/4, 5, 147, 148

[56] References Cited

U.S. PATENT DOCUMENTS

| | | | |
|---|---|---|---|
| 225,776 | 3/1880 | Wilson | 137/844 |
| 844,410 | 2/1907 | Schauer | 137/844 |
| 2,467,150 | 4/1949 | Nordell | 251/5 |
| 2,590,215 | 3/1952 | Sausa | 251/5 |
| 2,764,183 | 9/1956 | Gollehon | 137/844 |
| 3,353,560 | 11/1967 | McCulloch | 251/5 |
| 3,469,582 | 9/1969 | Jackson | 251/5 |
| 3,514,034 | 5/1970 | Cushman | 251/5 |
| 3,886,937 | 6/1975 | Bobo et al. | 137/843 |
| 4,195,810 | 4/1980 | Lavin | 251/5 |
| 4,642,833 | 2/1987 | Stoltz et al. | 15/1.7 |
| 4,684,364 | 8/1987 | Sawyer et al. | 137/843 |
| 4,742,593 | 5/1988 | Kallenbach | 15/1.7 |
| 4,769,867 | 9/1988 | Stoltz | 251/5 |
| 5,014,382 | 5/1991 | Kallenbach | 15/1.7 |

FOREIGN PATENT DOCUMENTS

| | | | |
|---|---|---|---|
| 204979 | 12/1983 | German Democratic Rep. | 137/843 |
| 672010 | 10/1989 | Switzerland | 137/843 |
| 2093954 | 9/1982 | United Kingdom | 137/843 |
| 2172195 | 9/1986 | United Kingdom | 15/1.7 |

Primary Examiner—Harvey C. Hornsby
Assistant Examiner—Mark Spisich
Attorney, Agent, or Firm—Kilpatrick & Cody

[57] ABSTRACT

Adjustable components for swimming pool cleaners or other devices are disclosed. The components, when forming part of a fluid-interruption cleaner, can accommodate a variety of diaphragms (valves) of different lengths. The exterior of the cleaner's inner tube, to which the diaphragm is attached, includes a series of spaced, concentric ribs, any selected group of which may be gripped by a cantilever ring positioned between the inner tube and the cleaner body. Because the inner tube may be alternatively positioned relative to the cantilever ring and body, it can accept and accommodate diaphragms of varying lengths. The components also facilitate removal of the diaphragm and inner tube from the cleaner for inspection or, for example, when repair or replacement is desired.

11 Claims, 2 Drawing Sheets

SWIMMING POOL CLEANER COMPONENTS

This is a continuation of copending application Ser. No. 07/879,772 filed on May 6, 1992 now abandoned.

This invention relates to components of swimming pool cleaners and more particularly to an adjustable tube and ancillary constituents of an automatic, fluid-interruption version of such cleaners.

BACKGROUND OF THE INVENTION

A variety of devices exist that move automatically over surfaces of swimming pools to be cleaned. One such pool cleaner operates in cooperation with the reduced pressure caused by a pump to induce debris-laden fluid within a pool to flow through the cleaner (and other filtration equipment if desired). The cleaner functions by causing a valve, or diaphragm, to oscillate, periodically interrupting the fluid flow through the cleaner. This periodic interruption in turn causes movement of the device over the surface to be cleaned. Suitable valves or diaphragms for such a fluid-interruption cleaner are described in U.S. Pat. Nos. 4,642,833 and 4,742,593, which patents are incorporated herein in their entireties by this reference.

U.S. Pat. No. 5,014,382, also incorporated herein in its entirety by reference, discloses one such fluid-interruption version of an automatic swimming pool cleaner. As described in the patent, the cleaner preferably includes a tubular resilient diaphragm to interrupt the flow of fluid (such as water) through the cleaner during use. The diaphragm entrance is typically located adjacent the inlet foot of the cleaner, while its exit communicates with an inner tube circumscribed by the cleaners rigid extension pipe (outer tube). Because the cleaner's exterior body (together with the inlet foot and inner tube) fix the diaphragm in position, the diaphragm is not easily removed from the cleaner for repair or replacement. Moreover, the rigid structures can accommodate only a single size diaphragm. As a result, not only must diaphragm manufacturing tolerances be minimized, but substitution of diaphragms of different lengths is precluded as well.

SUMMARY OF THE INVENTION

The present invention includes adjustable components that can accommodate a variety of diaphragms or other materials of different lengths. Although designed for use with automatic swimming pool cleaners, the components may also be utilized in other devices where such accommodation is necessary or desired. In one embodiment, the invention comprises an inner tube communicating with a diaphragm. The exterior of the inner tube includes a series of spaced, concentric ribs, any selected group of which may be gripped by a cantilever ring positioned between the inner tube and the cleaner body. Because the inner tube may be alternatively positioned relative to the cantilever ring and body, it can accept and accommodate diaphragms of varying lengths. The components also permit the diaphragm and inner tube to be removed from the cleaner with ease.

Swimming pool cleaners designed according to the present invention may also include an outer tube circumscribing a portion of the inner tube. The outer tube attaches to a hose when the device is used and typically rotates, or swivels, about its longitudinal axis to prevent unwanted coiling of the hose. The outer tube also includes a threaded collar or lock nut which permits it to be attached to a corresponding threaded portion of the cleaner body. Engaging the threads of the lock nut and body forces the cantilever ring against selected ribs of the inner tube and compresses the compression ring (and a resilient ring which may be positioned intermediate the compression ring and the diaphragm), thereby biasing, or loading, the diaphragm for improved performance. To remove the diaphragm and inner tube, by contrast, the lock nut need only be partially detached and a lug on the diaphragm (or any other portion thereof) grasped and pulled.

It is therefore an object of the present invention to provide adjustable components accommodating materials of different lengths.

It is an additional object of the present invention to provide components of a fluid-interruption swimming pool cleaner that can accommodate diaphragms of different lengths.

It is another object of the present invention to provide for easy removal of the diaphragm forming part of a cleaner when, for example, repair or replacement is necessary.

It is yet another object of the present invention to provide a device having inner and outer tubes, the inner tube of which may be connected to the diaphragm and the concentric volume between the inner and outer tubes and a resilient ring used to bias the diaphragm.

It is a further object of the present invention to provide means for gripping the inner tube and retaining it in place while the cleaner is in use but permitting the inner tube to be removed without substantial difficulty.

Other objects, features, and advantages of the present invention will become apparent with reference to the remainder of the written portion and the drawings of this application.

DETAILED DESCRIPTION

Figure 1:
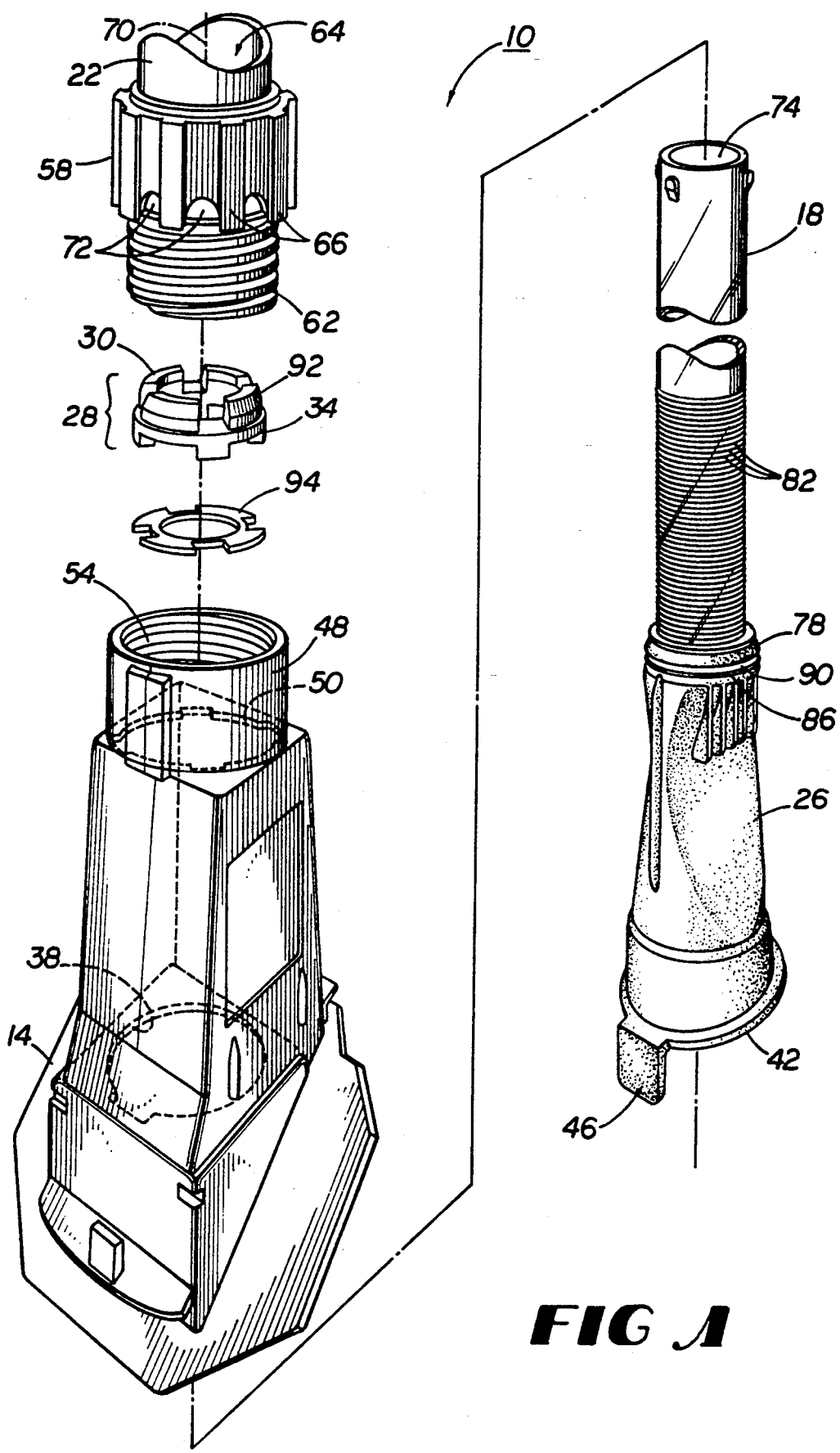
FIG. 1 is an exploded perspective view of the components of the present invention.
Figure 2:
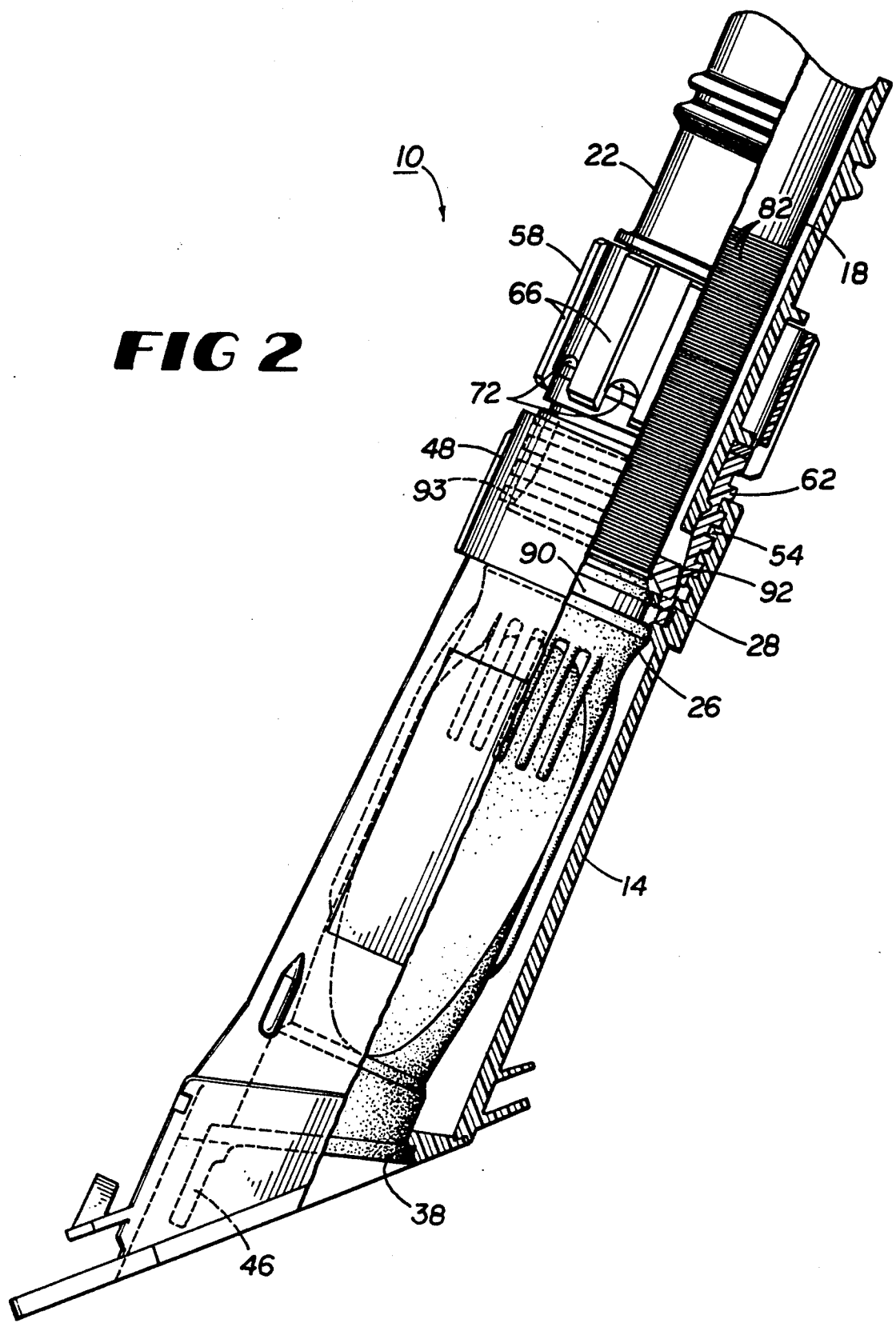
FIG. 2 is a partially-sectioned elevational view of the components of FIG. 1.

FIGS. 1-2 detail a portion of an automatic swimming pool cleaner 10 including components of the present invention. Shown in FIG. 1 are the body 14 of cleaner 10 together with inner tube 18, outer tube 22, and diaphragm 26. Also illustrated in FIG. 1 is ring 28, which comprises cantilever ring 30 attached to compression ring 34. These elements cooperate within the cleaner 10 to permit adjustment of inner tube 18 relative to body 14, allowing cleaner 10 to accommodate a variety of diaphragms 26. The elements also facilitate removal of diaphragm 26 from cleaner 10 for inspection or when repair or replacement is necessary or desired.

Body 14 defines aperture 38 of diameter slightly less than the exterior diameter of inlet portion 42 of diaphragm 26. Aperture 38 also includes a section corresponding to lug 46 of diaphragm 26 and is designed to receive the inlet portion 42 and lug 46 and limit movement of the diaphragm 26 within body 14. Aperture 38 and inlet portion 42 are typically submerged during use of cleaner 10, providing an entrance for debris-laden fluid into the cleaner and any related filtration system (if present). Formed opposite the remainder of body 14 from aperture 38 is cylindrical section 48, which defines aperture 50 and includes interior threads 54. Aperture 50 is shaped so as to receive ring 28 and retain it in position during normal operation of cleaner 10.

Elongated outer tube 22 includes a tapered first end (not shown) for connection to a hose and a second end opposite the first end about which collar or lock nut 58 is placed. Lock nut 58 includes a threaded exterior portion 62 for engaging interior threads 54 of body 14. In some (but not necessarily all) embodiments, the pitch of the threads of threaded exterior portion 62 is between five to eight millimeters. With the threaded exterior portion 62 of outer tube 22 and interior threads 54 of body 14 engaged, outer tube 22 and body 14 define a continuous tubular segment 64 ranging from aperture 38 to the tapered first end of body 14 attached to the hose.

Integrally formed with threaded exterior portion 62 is a series of exterior protrusions 66, which facilitate grasping of lock nut 58 when engaging or disengaging the outer tube 22. Placement of lock nut 58 about outer tube 22 also permits outer tube 22 to rotate, or swivel, about its longitudinal axis 70 while cleaner 10 is in use. Allowing rotation of outer tube 22 minimizes coiling of the attached hose as the cleaner 10 moves about the surface to be cleaned, reducing the possibility that coiling of the hose will interrupt or otherwise degrade movement of cleaner 10 over the debris-laden surface. Apertures 72 defined by lock nut 58 additionally permit debris entrapped within the lock nut 58 to exit cleaner 10.

Fitted within tubular segment 64 is inner tube 18. As shown in FIGS. 1-2, inner tube 18 includes opposite first and second ends 74 and 78, respectively, and an exterior having a series of parallel, annular ribs 82 near second end 78. Second end 78 of inner tube 18 is adapted to attach to outlet 86 of diaphragm 26, with compression ring 90 used to retain diaphragm 26 in place. This attachment permits inner tube 18 and diaphragm 26 to be inserted into and removed from tubular segment 64 as a unit, facilitating repair or replacement of, e.g., diaphragm 26 should such be desired.

Diaphragm 26 may typically be made of resilient Santoprene or other injection- or compression-moldable rubber. For these rubbers an optimal range exists for travel within the molds, with higher quality diaphragms 26 generally resulting when the rubber travels a shorter distance within the molds. Decreasing the length of diaphragm 26 to one hundred millimeters, for example, provides one method of reducing travel distance within the molds. Decreasing the length of (and therefore the amount of rubber or other matter comprising) diaphragm 26 also reduces its overall raw material cost. The adjustable nature of cleaner 10 specifically accommodates these shorter diaphragms, allowing the cleaner manufacturers to benefit from the reduced diaphragm costs.

The structure of cleaner 10 also facilitates removal of diaphragm 26 for, e.g., inspection, repair, resetting, or replacement. To remove diaphragm 26, one need merely loosen lock nut 58, grasp lug 46, and pull lug 46 substantially along axis 70. Pulling lug 46 disengages ribs 82, of inner tube 18 from cantilever ring 30, permitting both diaphragm 26 and the connected inner tube 18 to move through the tubular segment 64 relative to body 14.

Disconnecting outer tube 22 and body 14 and sliding the first end 74 of inner tube 18 through apertures 38 and 50 permit easy replacement of the inner tube 18 and diaphragm 26. Outer tube 22 may then be fitted over inner tube 1a and the threaded exterior portion 62 of outer tube 22 caused to engage interior threads 54 of body 14 so as to secure the connection between outer tube 22 and body 14. Tightening lock nut 58 also compresses ring 28, thereby forcing cantilever ring 30 to engage one or more ribs 82 to retain inner tube 18 in place and effectively loading, or containing, diaphragm 26. In some embodiments of cleaner 10, the exterior 92 of cantilever ring 30 contacted by lock nut 58 tapers to form an angle of approximately ten to twenty degrees, and preferably 14°, with a line parallel to axis 70 (i.e. is canted off axis approximately ten to twenty degrees). In these embodiments the portion 93 of the interior of lock nut 58 contacting exterior 92 is canted or tapered in a complementary manner so as to translate the typical amount of torque supplied by hand tightening lock nut 58 to suitable compression of ring 28. The designs of cantilever ring 30 and lock nut 58 are not so limited, however, and the cantilever ring 30 may assume a variety of orientations relative to locking nut 58 and axis 70.

Cleaner 10 may also include a resilient ring 94 positioned intermediate ring 28 and diaphragm 26 to bias, or compress, the diaphragm 26. As lock nut 58 tightens, cantilever ring 30 engages ribs 82 and transfers some of the force delivered by lock nut 58 to resilient ring 94 and diaphragm 26, effectively biasing diaphragm 26 shorter than its designed length when cleaner 10 is in operation. In some embodiments, this arrangement decreases the effective length of diaphragm 26 between approximately one-half and one and one-half millimeters and may improve performance of cleaner 10 under certain conditions.

The foregoing is provided for purposes of illustration, explanation, and description of embodiments of the present invention. Modifications and adaptations to these embodiments will be apparent to those of ordinary skill in the art and they may be made without departing from the scope and spirit of the invention.

What is claimed is:

1. An assembly for permitting fluid flow comprising:
    a. a body defining an inlet, an outlet, and a passage between the inlet and the outlet for fluid to flow herethrough;
    b. means, comprising a valve removably positioned within the passage, for periodically interrupting the flow of fluid through the passage;
    c. a first tube attached to the valve; and
    d. means, received by the outlet and comprising a ring having a canted surface engaging a portion of said first tube and circumscribing a portion of the first tube, for resisting but not precluding movement of the first tube relative to the body.

2. An assembly according to claim 1 further comprising:
    a. a second tube adapted to circumscribe at least a portion of the first tube; and
    b. means for removably attaching the second tube to the body.

3. An assembly according to claim 1 in which the first tube has an exterior surface comprising a plurality of annular ribs.

4. An assembly according to claim 1 in which the valve comprises a diaphragm which has a lug integrally formed therewith.

5. An assembly for permitting fluid flow comprising:
    a. a body defining an inlet, a threaded outlet, and a passage between the inlet and the outlet for fluid to flow herethrough;

b. means, comprising a valve removably positioned within the passage, for periodically interrupting the flow of fluid through the passage;

c. a first tube attached to the valve;

d. means, received by the outlet and circumscribing a potion of the first tube, for resisting but not precluding movement of the first tube relative to the body;

e. a second tube adapted to circumscribe at least a portion of the first tube;

f. means for removably attaching the second tube to the body; and g. a threaded collar connected to the second tube and adapted to engage the threaded outlet of the body.

6. An assembly according to claim 5 in which (i) the first tube has an exterior surface comprising a plurality of annular ribs and (ii) the means for resisting movement comprises a compressible ring having an exterior and adapted to engage the body and when compressed to engage at least one of the annular ribs.

7. An assembly according to claim 6 in which the second tube defines a longitudinal axis and at least a portion of the exterior of the compressible ring is canted approximately 10°-20° off the longitudinal axis.

8. An assembly for permitting fluid flow comprising:

a. a body defining an inlet, a threaded outlet, and a passage between the inlet and the outlet for fluid to flow therethrough;

b. a diaphragm removably positioned within the passage for periodically interrupting the flow of fluid through the passage, which diaphragm comprises (1) an inlet adapted to abut the inlet of the body, (2) an outlet, and (3) an integrally-formed lug;

c. a first tube defining an inlet attached to the outlet of the diaphragm and having an exterior surface comprising a plurality of annular ribs;

d. means for attaching the diaphragm and the first tube;

e. a compressible ring fitted within the outlet of the body and circumscribing a portion of the first tube that, when compressed, engages at least one of the angular ribs;

f. a second tube defining a longitudinal axis and adapted to circumscribe at least a portion of the first tube; and g. a threaded collar connected to the second tube and adapted to engage the threaded outlet of the body, for removably attaching the second tube to the body while permitting the second tube to rotate about the longitudinal axis.

9. An assembly according to claim 8 further comprising a resilient ring, intermediate the compressible ring and the diaphragm and contacting both when the compressible ring is compressed, for biasing the diaphragm.

10. An assembly according to claim 9 in which the resilient ring biases the diaphragm so as to decrease the effective length of the diaphragm by approximately 0.5-1.5 mm.

11. An assembly for permitting fluid flow comprising:

a. a body defining an inlet, a threaded outlet, and a passage between the inlet and the outlet for fluid to flow therethrough;

b a diaphragm removably positioned within the passage for periodically interrupting the flow of fluid through the passage, which diaphragm comprises (1) an inlet adapted to abut the inlet of the body, (2) an outlet, and (3) an integrally-formed lug;

c. a first tube defining an inlet attached to the outlet of the diaphragm and having an exterior surface comprising a plurality of annular ribs;

d. means for attaching the diaphragm and the first tube;

e. a second tube defining a longitudinal axis and adapted to circumscribe at least a portion of the first tube;

f. a compressible ring fitted within the outlet of the body and circumscribing a portion of the first tube that, when compressed, engages at least one of the annular ribs, which compressible ring further has an exterior at least a portion of which is canted approximately 10°-20° off the longitudinal axis;

g. a threaded collar connected to the second tube, defining a plurality of apertures, and adapted to engage the threaded outlet of the body, for removably attaching the second tube to the body while permitting the second tube to rotate about the longitudinal axis and allowing any selected entrapped debris to exit the assembly; and h. a resilient ring, intermediate the compressible ring and the diaphragm and contacting both when the compressible ring is compressed, for biasing the diaphragm so as to decrease the effective length of the diaphragm by approximately 0.5-1.5 mm.

* * * * *

UNITED STATES PATENT AND TRADEMARK OFFICE
CERTIFICATE OF CORRECTION

PATENT NO. : 5,315,728
DATED : May 31, 1994
INVENTOR(S) : David S. Atkins

It is certified that error appears in the above-indentified patent and that said Letters Patent is hereby corrected as shown below:

Column 1, line 34, delete "cleaners" and insert --cleaner's--

Column 4, line 43, delete "herethrough;" and insert --therethrough;--

Column 4, line 68, delete "herethrough;" and insert --therethrough;--

Column 6, line 16, delete "b" and insert --b.--

Signed and Sealed this

Eleventh Day of April, 1995

Attest:

BRUCE LEHMAN

*Attesting Officer*      *Commissioner of Patents and Trademarks*